J. RIEBE.
Hand Corn-Planters.
No. 148,899.  Patented March 24, 1874.
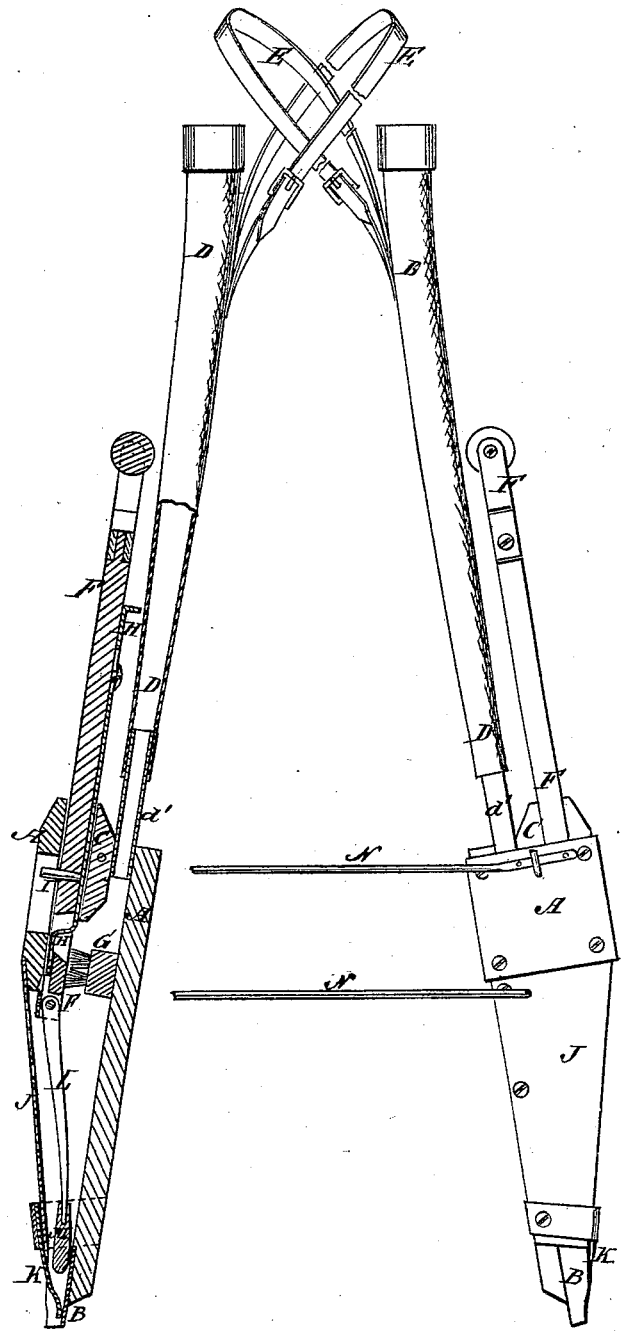

UNITED STATES PATENT OFFICE.

JAMES RIEBE, OF CEDAR LAKE, INDIANA.

IMPROVEMENT IN HAND CORN-PLANTERS.

Specification forming part of Letters Patent No. 148,899, dated March 24, 1874; application filed September 13, 1873.

*To all whom it may concern:*

Be it known that I, JAMES RIEBE, of Cedar Lake, in the county of Lake and State of Indiana, have invented a new and useful Improvement in Double Hand Corn-Planter, of which the following is a specification:

The figure is a front view of my improved planter, partly in section, to show the construction.

The invention will first be fully described, and then pointed out in the claims.

A is a box, the inner side of which extends downward, and has a plate, B, having its side edges flanged, attached to the outer side of its lower end, to enter the ground and guide the seed to the ground. The upper part of the box A is divided into two small compartments by a block, C, attached to the front and rear sides of said box. D is the seed bag or pouch, which is made long so as to come up under the arms of the operator, and to its upper part are attached straps E, to pass over the shoulders of the operator to support the weight. The lower end of the bag D is attached to a short tube or spout, d', which enters and is secured in the upper part of the inner compartment of the box A. From the inner compartment of the box A the corn passes beneath the lower end of the block C into a cavity in the sliding bar F, which fits into and slides up and down in the outer compartment of the box A. G is a brush, the back of which is attached to the inner side board of the box A, so that the ends of the bristles may rest against the dropping-slide F, and act as a cut-off to prevent any more corn than enough to fill the cavity in said dropping-slide from being carried out by said slide in its downward movement. The upper side of the cut-off brush serves as a bottom to the inner compartment of the box A. The size of the dropping-cavity of the slide F is adjusted according to the amount of seed required for a hill by a plate, H, the upper part of which extends up along the inner side of the slide F. The lower part of the plate H is bent twice at right angles, so as to pass through the cavity of the slide F, and extends down along the outer side of the lower end of the said slide F. The plate H is secured in place, when adjusted, by a clamping-screw, which passes through a slot in said plate H, and screws into the slide F. Upon the upper end of the slide F is formed a handle for convenience in operating it. The upward and downward movement of the slide F is limited by a pin, I, attached to it, and which passes through a slot in the outer side board of the box A. The front, rear, and outer sides of the lower part of the planter are incased by a plate of light sheet metal, J, to form, in connection with the extended lower part of the inner side board of the box A, a spout to conduct the seed to the ground. K is a spring-plate attached to the lower part of the planter, and the free lower end of which rests against the lower part of the outer side of the plate B. To the lower end of the dropping-slide F is pivoted the upper end of the rod L, to the lower end of which is attached a block, M, of such a size that when the dropping-slide F is pushed downward the block M will push back the spring K, and allow the corn to drop into the ground between the spring K and plate B. When the corn is not to be covered, the spring K is detached.

Two of the planters are used at the same time, one being suspended at each side of the operator, and which are connected by two rods, N, so as to be always at the same distance apart, thus forming a double planter.

The advantage gained by placing my plungers on the outside is, that I am thus enabled to make a much cheaper and more durable planter.

Having thus described my invention, I claim as new and desire to secure by Letters Patent—

1. The feed-plate F, having slide H on one side, bent near its lower end to pass through a slot of the feed-plate, and then down onto the other side of said plate, to enable the feed to be graduated, in the manner described.

2. The combination, with a pair of seeders inclined toward each other, of feed-plates and plungers F L, jointed together as described, to enable the plate F to be brought within suitable distances for being conveniently manipulated.

JAMES RIEBE.

Witnesses:
STEPHEN LAUX,
LEWIS RUDOLPH.